United States Patent

Nieschulz

[11] Patent Number: 5,574,316
[45] Date of Patent: Nov. 12, 1996

[54] VEHICLE BATTERY DISABLING APPARATUS

[76] Inventor: Emil W. Nieschulz, 7132 Scheurer St., Pigeon, Mich. 48755

[21] Appl. No.: 521,875
[22] Filed: Aug. 31, 1995
[51] Int. Cl.⁶ .................................................. H01H 9/20
[52] U.S. Cl. ..................... 307/10.7; 307/9.1; 307/10.1; 307/10.2; 180/271; 180/279; 180/282; 180/287; 335/6; 335/15; 335/176
[58] Field of Search ............................. 307/9.1–10.8, 307/116–123; 318/489, 457; 340/426; 335/6, 13, 15, 166–176; 180/271, 279, 282–284, 287; 361/114, 115, 160; 200/52 R, 61.45 R, 61.53

[56] References Cited

U.S. PATENT DOCUMENTS

| | | | |
|---|---|---|---|
| 1,175,323 | 3/1916 | Wikander | 335/15 |
| 1,442,311 | 1/1923 | Watson | 307/10.1 |
| 1,576,228 | 3/1926 | Schmieze | 335/174 |
| 1,956,484 | 4/1934 | Bate | 180/287 |
| 2,096,291 | 10/1937 | Tanner | 307/10.2 |
| 2,478,691 | 8/1949 | Garrigan | 335/171 |
| 2,685,012 | 7/1954 | Coulson | 335/170 |
| 3,286,055 | 11/1966 | Jewell | 200/61.45 R |
| 3,459,954 | 8/1969 | Sgorbani | 307/10.7 |
| 3,692,965 | 9/1972 | Gardner | 307/10.2 |
| 3,703,617 | 11/1972 | Burnett | 180/282 |
| 3,820,361 | 6/1974 | Leitner | 307/10.2 |
| 3,821,501 | 6/1974 | Parmenter | 307/10.2 |
| 3,881,461 | 5/1975 | Filip | 180/271 |
| 3,882,957 | 5/1975 | Fritz | 180/284 |
| 3,907,060 | 9/1975 | Burton | 307/10.3 |
| 4,063,610 | 12/1977 | Shilling | 307/10.3 |
| 4,149,093 | 4/1979 | D'Alessio | 307/10.7 |
| 4,306,126 | 12/1981 | Howard | 200/52 R |
| 4,310,817 | 1/1982 | McNiel | 335/13 |
| 4,553,127 | 11/1985 | Issa | 307/10.3 |
| 4,761,564 | 8/1988 | Nollez | 307/118 |
| 4,798,968 | 1/1989 | Deem | 307/10.7 |
| 5,034,620 | 7/1991 | Cameron | 200/61.52 |
| 5,128,551 | 7/1992 | Clokie | 307/10.1 |
| 5,129,713 | 7/1992 | Matsuda | 340/636 |
| 5,184,023 | 2/1993 | Carlo | 307/10.3 |
| 5,191,228 | 3/1993 | Sloan | 307/10.6 |
| 5,200,877 | 4/1993 | Betton | 307/10.2 |
| 5,300,905 | 4/1994 | Kolbas | 335/167 |
| 5,327,990 | 7/1994 | Busquets | 307/10.1 |
| 5,449,957 | 9/1995 | Carlo | 307/10.3 |

Primary Examiner—William M. Shoop, Jr.
Assistant Examiner—Peter Ganjoo

[57] ABSTRACT

A vehicle battery disabling apparatus for disconnecting a battery of a vehicle including a solenoid having a retracted orientation when electrically energized and an extended orientation when de-energized; a first switch mechanism coupleable between an electrical system of the vehicle and its battery and further engaged with the solenoid and having a first orientation when the solenoid is de-energized for allowing electrical energy to be delivered from the battery to the electrical system and a second orientation when the solenoid is energized for preventing such delivery; a spring-loaded plunger having a biased and extended orientation when impact pressure is applied thereto and an unbiased and retracted orientation when no impact pressure is applied; and a second switch mechanism coupled to the solenoid and further positioned in juxtaposed relation to the plunger and having an activated orientation when the plunger is momentarily abutted thereagainst in its biased and extended orientation for energizing the solenoid.

4 Claims, 3 Drawing Sheets

VEHICLE BATTERY DISABLING APPARATUS

BACKGROUND OF THE INVENTION

1. Field of the Invention

The present invention relates to a vehicle battery disabling apparatus and more particularly pertains to disconnecting a battery of a vehicle upon the discretion of a user or in the event of a collision with a vehicle battery disabling apparatus.

2. Description of the Prior Art

The use of vehicle battery disabling devices is known in the prior art. More specifically, vehicle battery disabling devices heretofore devised and utilized for the purpose of disabling the battery of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. Des. No. 299,822 to Constable et al. discloses a battery disconnect switch. U.S. Pat. No. 3,703,617 to Burnett discloses an automatic disconnect for a vehicular battery. U.S. Pat. No. 5,129,713 to Matsuda discloses an anti-skid brake control system with fail-safe system responsive to abnormal power supply. U.S. Pat. No. 5,200,877 to Betton et al. discloses a battery protection system. U.S. Pat. No. 5,327,990 to Busquets discloses an integral automatic system for protection and rescue of occupants in crashed automobiles.

While these devices fulfill their respective, particular objective and requirements, the aforementioned patents do not describe a vehicle battery disabling apparatus that allows a battery of a vehicle to be disconnected in the event of a collision or at the discretion of a user.

In this respect, the vehicle battery disabling apparatus according to the present invention substantially departs from the conventional concepts and designs of the prior art, and in doing so provides an apparatus primarily developed for the purpose of disconnecting a battery of a vehicle upon the discretion of a user or in the event of a collision.

Therefore, it can be appreciated that there exists a continuing need for new and improved vehicle battery disabling apparatus which can be used for disconnecting a battery of a vehicle upon the discretion of a user or in the event of a collision. In this regard, the present invention substantially fulfills this need.

SUMMARY OF THE INVENTION

In the view of the foregoing disadvantages inherent in the known types of vehicle battery disabling devices now present in the prior art, the present invention provides an improved vehicle battery disabling apparatus. As such, the general purpose of the present invention, which will be described subsequently in greater detail, is to provide a new and improved vehicle battery disabling apparatus and method which has all the advantages of the prior art and none of the disadvantages.

To attain this, the present invention essentially comprises, in combination, a solenoid coupleable to a battery of the vehicle and having a retracted orientation when electrically energized and an extended orientation when de-energized. A pivotable first switch mechanism is included and coupleable between an electrical system of the vehicle and its battery. The first switch mechanism is further engaged with the solenoid and has a first orientation when the solenoid is de-energized for allowing electrical energy to be delivered from the battery to the electrical system and a second orientation when the solenoid is energized for preventing such delivery. An elongated and spring-loaded plunger is provided and has a biased and extended orientation when impact pressure is applied thereto and an unbiased and retracted orientation when no impact pressure is applied. An electronic and depressible second switch mechanism is included and coupled to the solenoid. The second switch mechanism is also coupleable to the battery of the vehicle. The second switch mechanism is further positioned in a juxtaposed relation to the plunger. The second switch mechanism has an activated orientation when the plunger is momentarily abutted thereagainst in its biased and extended orientation for energizing the solenoid. Lastly, a manually activated electronic third switch mechanism is included. The third switch mechanism is coupled to the second switch means. The third switch mechanism is also coupleable to the battery of the vehicle. The third switch mechanism has an engaged orientation for placing the second switch mechanism in its activated orientation to thereby allow the battery to be disconnected from the vehicle electrical system.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle battery disabling apparatus which has all the advantages of the prior art vehicle battery disabling devices and none of the disadvantages.

It is another object of the present invention to provide a new and improved vehicle battery disabling apparatus which may be easily and efficiently manufactured and marketed.

It is a further object of the present invention to provide a new and improved vehicle battery disabling apparatus which is of durable and reliable construction.

An even further object of the present invention is to provide a new and improved vehicle battery disabling apparatus which is susceptible of a low cost of manufacture with regard to both materials and labor, and which accordingly is then susceptible of low prices of sale to the consuming public, thereby making such a vehicle battery disabling apparatus economically available to the buying public.

Still yet another object of the present invention is to provide a new and improved vehicle battery disabling apparatus which provides in the apparatuses and methods of the prior art some of the advantages thereof, while simultaneously overcoming some of the disadvantages normally associated therewith.

Even still another object of the present invention is to provide a new and improved vehicle battery disabling apparatus for disconnecting a battery of a vehicle upon the discretion of a user or in the event of a collision.

Lastly, it is an object of the present invention to provide a new and improved vehicle battery disabling apparatus comprising a solenoid coupleable to a battery of the vehicle and having a retracted orientation when electrically energized and an extended orientation when de-energized; pivotable first switch means coupleable between an electrical system of the vehicle and its battery and further engaged with the solenoid, the first switch means having a first orientation when the solenoid is de-energized for allowing electrical energy to be delivered from the battery to the electrical system and a second orientation when the solenoid is energized for preventing such delivery; an elongated and spring-loaded plunger having a biased and extended orientation when impact pressure is applied thereto and an unbiased and retracted orientation when no impact pressure is applied; and electronic and depressible second switch means coupled to the solenoid and coupleable to the battery of the vehicle and further positioned in juxtaposed relation to the plunger, the second switch means having an activated orientation when the plunger is momentarily abutted thereagainst in its biased and extended orientation for energizing the solenoid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
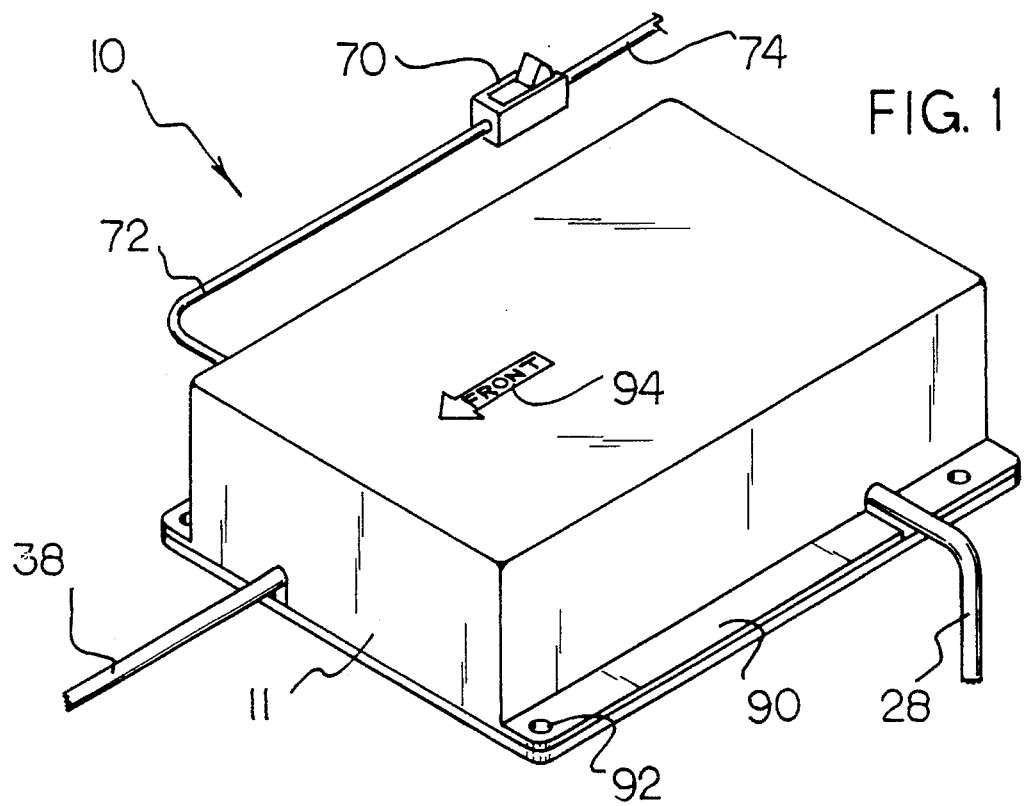
FIG. 1 is a perspective view of the preferred embodiment constructed in accordance with the principles of the present invention.
Figure 2:
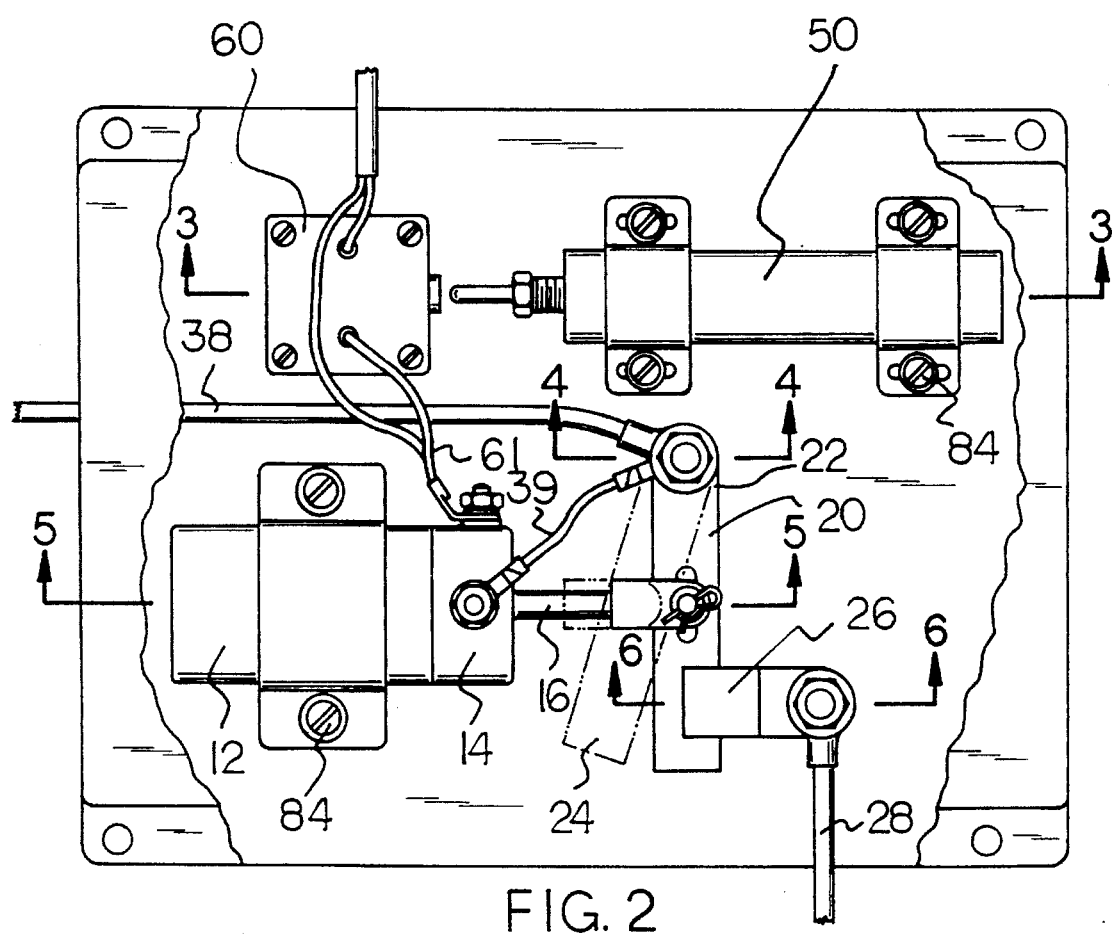
FIG. 2 is a plan fragmentary view of the preferred embodiment of the present invention.
Figure 3:
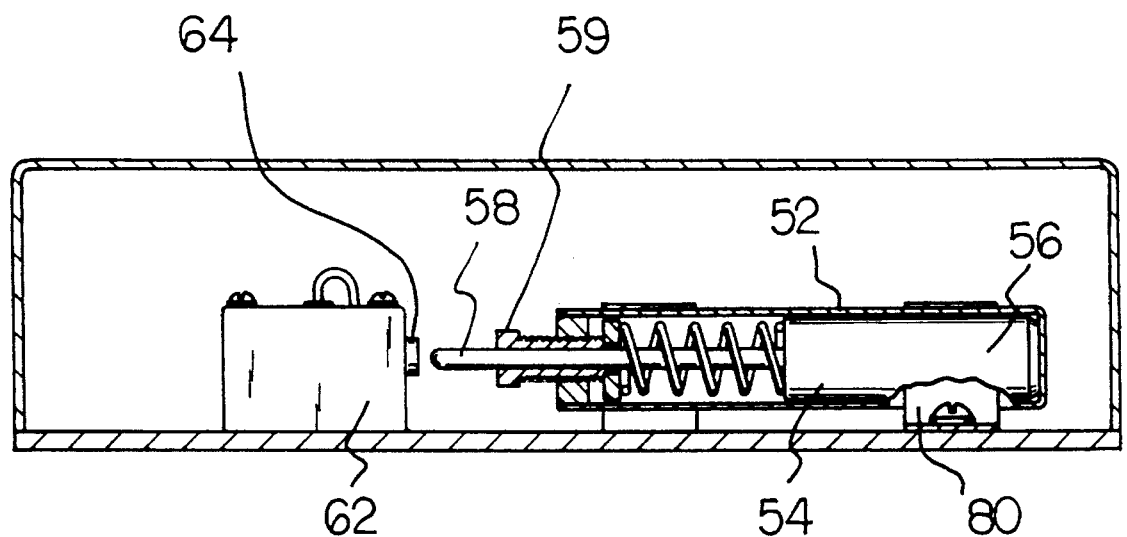
FIG. 3 is a cross-sectional view of the present invention taken along the line 3—3 of FIG. 2.
Figure 4:
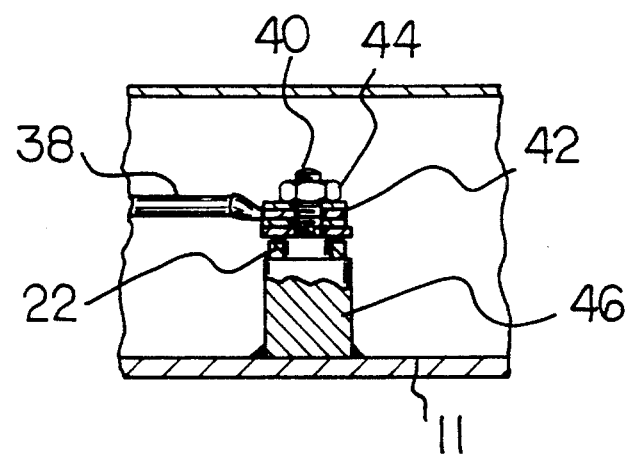
FIG. 4 is a cross-sectional view of the present invention taken along the line 4—4 of FIG. 2.
Figure 5:
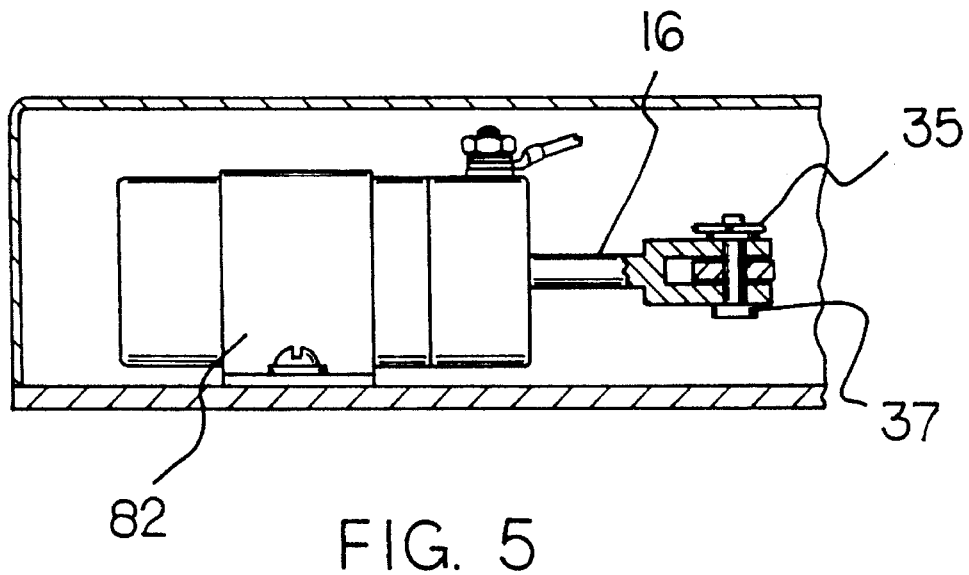
FIG. 5 is a cross-sectional view of the present invention taken along the line 5—5 of FIG. 2.
Figure 6:
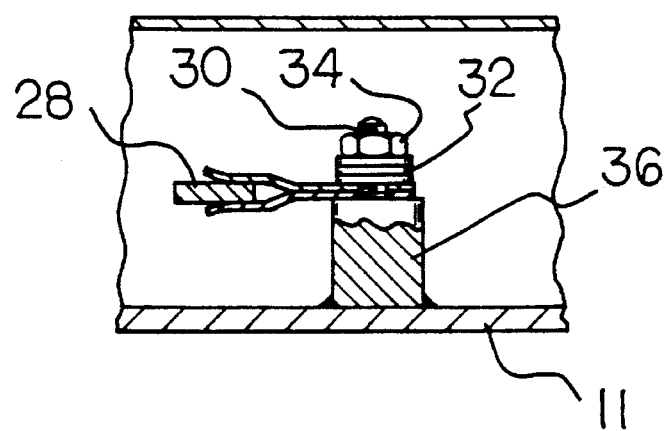
FIG. 6 is a cross-sectional view of the present invention taken along the line 6—6 of FIG. 2.

With reference now to the drawings, and in particular, to FIGS. 1 and 2 thereof, the preferred embodiment of the new and improved vehicle battery disabling apparatus embodying the principles and concepts of the present invention and generally designated by the reference number 10 will be described.

The preferred embodiment of the present invention comprises a plurality of components. In their broadest context, such components include a casing, solenoid, switch mechanisms, and plunger. Such components are individually configured and correlated with respect to each other to provide the intended function of disconnecting a battery of a vehicle upon the discretion of a user or in the event of a collision.

Specifically, the present invention includes a generally box-shaped plastic or metal casing 11. A solenoid 12 is disposed within the casing. The solenoid 12 is coupleable to a battery of the vehicle. The solenoid has a body 14 and a movable rod 16. The rod has a retracted orientation when the body is electrically energized and an extended orientation when the body is de-energized.

A pivotable first switch mechanism is also provided and disposed within the casing 11. The first switch mechanism is formed of an electrically conductive metal lever 20 having a first fixed end 22 and a rotating end 24. In addition, an electrical contact 26 is engagable with the rotating end 24 to provide a closed path through which electrical energy can travel. The first switch mechanism is coupleable between an electrical system of the vehicle through wire 28 secured to contact 26 with bolt 30, washers 32, and hexagonal nut 34. The bolt 30 is secured to an integral mounting post 36 of casing 11. The first switch mechanism is further coupleable to the vehicle's battery through wire 38 and 39. Wire 38 is secured to the first end 22 of the lever 20 with bolt 40, washer 42, and hexagonal nut 44. The bolt 40 is secured to an integral mounting post 46 of casing 11. The first switch mechanism is engaged with the solenoid through use of rod 16 connected with lever 20 with pin 37 and associated key 35. The first switch mechanism has a first orientation or normal position when the solenoid is de-energized for allowing electrical energy to be delivered from the battery to the electrical system through wires 38 and 28. The first switch mechanism also has a second orientation or open position when the solenoid is energized for preventing such electrical energy to the vehicle electrical system.

Also included is an elongated and spring-loaded plunger 50. Plunger 50 is disposed within the casing 11. The plunger has a tubular sleeve 52 and an axially movable slider 54 disposed within the sleeve. The slider 54 has an impact end 56 and a driving end 58. The plunger has a biased and extended orientation when impact pressure is applied to its impact end and an unbiased and retracted orientation when no impact pressure is applied. Impact pressure can be applied to the driving end such as during a collision of the vehicle with another object. The distance to which the driving end of the plunger is extendable is adjustable through an adjusting screw 59.

An electronic and depressible second switch mechanism 60 is disposed within the casing 11. The second switch mechanism is formed of a conventional microswitch. Switch mechanism 60 is coupled to the solenoid through use of wires 61 and is also coupleable to the battery of the vehicle. The second switch mechanism is positioned in a juxtaposed relation to the plunger 50. The microswitch has a body 62 and a button 64 that extends outwards at a position offset from and aligned with the driving end 58 of the plunger. The second switch mechanism has an activated orientation when the driving end of the plunger is momentarily abutted against the button 64 such as during a collision for energizing the solenoid.

Lastly, a manually activated electronic third switch mechanism 70 is coupled to the second switch mechanism 60 through the use of a wire 72. The third switch mechanism is further coupleable to the battery of the vehicle through use of another wire 74. The third switch mechanism has an engaged orientation for placing the second switch means 60 in its activated orientation to engage the solenoid 12 to thus allow the battery to be disconnected from the vehicle electrical system.

The solenoid and plunger are secured to the casing using clamps 80, 82 and associated bolts 84. The casing is securable to a vehicle through the use of outwardly extending flanges 90 formed on its lower extent. Flanges 90 have integral thru-holes 92 through which fasteners can be inserted and attached to a vehicle. In addition, the upper extent of the casing bears indicia 94 thereon to insure proper orientation of the driving end 58 of the plunger to probable impact pressure.

The present invention is an electromechanical device that disables a vehicle's battery in the event of a collision. The present invention includes a solenoid, microswitch, plunger with spiral spring, and metal mounting bar. All of the components of the present invention are mounted on a rectangular board of a casing. The plunger of the present invention is spring-loaded. The spring has a spring constant that impedes movement of the plunger of vehicular impacts of less than 15 or 20 mph. When a vehicle equipped with the present invention collides with another object, the plunger's shaft moves to press up against the microswitch, thus disabling the battery. The present invention should greatly reduce the possibility of a vehicle fire caused by an electrical short igniting spilt fuel in the event of an accident or collision.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A vehicle battery disabling apparatus for disconnecting a battery of a vehicle upon the discretion of a user or in the event of a collision comprising, in combination:

a solenoid coupleable to a battery of the vehicle and having a retracted orientation when electrically energized and an extended orientation when de-energized;

pivotable first switch means coupleable between an electrical system of the vehicle and its battery and further engaged with the solenoid, the first switch means having a first orientation when the solenoid is de-energized for allowing electrical energy to be delivered from the battery to the electrical system and a second orientation when the solenoid is energized for preventing such delivery;

an elongated and spring-loaded plunger having a biased and extended orientation when impact pressure is applied thereto and an unbiased and retracted orientation when no impact pressure is applied;

electronic and depressible second switch means coupled to the solenoid and coupleable to the battery of the vehicle and further positioned in juxtaposed relation to the plunger, the second switch means having an activated orientation when the plunger is momentarily abutted thereagainst in its biased and extended orientation for energizing the solenoid; and manually activated electronic third switch means coupled to the second switch means and coupleable to the battery of the vehicle, the third switch means having an engaged orientation for placing the second switch means in its activated orientation to thereby allow the battery to be disconnected from the vehicle electrical system.

2. A vehicle battery disabling apparatus for disconnecting a battery of a vehicle comprising:

a solenoid coupleable to a battery of the vehicle and having a retracted orientation when electrically energized and an extended orientation when de-energized;

pivotable first switch means coupleable between an electrical system of the vehicle and its battery and further engaged with the solenoid, the first switch means having a first orientation when the solenoid is de-energized for allowing electrical energy to be delivered from the battery to the electrical system and a second orientation when the solenoid is energized for preventing such delivery;

an elongated and spring-loaded plunger having a biased and extended orientation when impact pressure is applied thereto and an unbiased and retracted orientation when no impact pressure is applied; and electronic and depressible second switch means coupled to the solenoid and coupleable to the battery of the vehicle and further positioned in juxtaposed relation to the plunger, the second switch means having an activated orientation when the plunger is momentarily abutted thereagainst in its biased and extended orientation for energizing the solenoid.

3. The vehicle battery disabling apparatus as set forth in claim 2 and further comprising:

manually activated electronic third switch means coupled to the second switch means and coupleable to the battery of the vehicle, the third switch means having an engaged orientation for placing the second switch means in its activated orientation to thereby allow the battery to be disconnected from the vehicle electrical system.

4. The vehicle battery disabling apparatus as set forth in claim 2 and further comprising:

a casing encompassing the solenoid, first switch means, plunger, and second switch means and bearing indicia thereupon to ensure proper orientation of the plunger to probable impact pressure; and coupling means for securing the casing to the vehicle.

* * * * *